United States Patent [19]
Garner et al.

[11] Patent Number: 5,822,187
[45] Date of Patent: Oct. 13, 1998

[54] HEAT PIPES INSERTED INTO FIRST AND SECOND PARALLEL HOLES IN A BLOCK FOR TRANSFERRING HEAT BETWEEN HINGED DEVICES

[75] Inventors: Scott D. Garner, Lititz; George A. Meyer, IV, Conestoga; Jerome E. Toth, Hatboro; Richard W. Longsderff, Lancaster, all of Pa.

[73] Assignee: Thermal Corp., Georgetown, Del.

[21] Appl. No.: 735,191

[22] Filed: Oct. 25, 1996

[51] Int. Cl.⁶ .............................. G06F 1/20; H05K 7/20; F28D 15/02

[52] U.S. Cl. .................. 361/687; 361/700; 62/259.2; 165/104.33; 174/15.2

[58] Field of Search ................ 364/708.1; 165/80.4, 165/104.33, 104.21; 62/259.2; 174/15.2; 361/687, 699, 680, 681, 700, 704, 707

[56] References Cited

U.S. PATENT DOCUMENTS

| | | | |
|---|---|---|---|
| 3,831,664 | 8/1974 | Pogson | 165/104.26 |
| 4,069,864 | 1/1978 | Novoryta et al. | 165/104.26 |
| 4,345,642 | 8/1982 | Ernst | 165/104.26 |
| 5,117,901 | 6/1992 | Cullimore | 165/104.26 |
| 5,343,940 | 9/1994 | Jean | 257/715 |
| 5,383,340 | 1/1995 | Larson et al. | 361/700 |
| 5,413,167 | 5/1995 | Hara et al. | 165/104.33 |
| 5,598,320 | 1/1997 | Toedtman et al. | 361/687 |
| 5,621,613 | 4/1997 | Haley et al. | 361/687 |
| 5,646,822 | 7/1997 | Bhatia et al. | 361/687 |

*Primary Examiner*—Michael W. Phillips
*Attorney, Agent, or Firm*—Martin Fruitman

[57] ABSTRACT

The apparatus is a device for transferring heat across the hinged joint between the two sections of the case of a laptop computer. Two simple heat pipe cylinders are inserted into parallel cylindrical holes in a heat conductive block. One cylinder is bonded within its hole, and the other cylinder is permitted to rotate within its hole. The axis of the rotatable cylinder is located in line with the axis of the mechanical hinges which permit the panels to pivot relative to each other. A heat producing device in one panel can be then attached to one heat pipe, and a heat sink on the other panel can be attached to the other heat pipe. The heat transfer between the heat source and the heat sink is essentially that of a heat pipe except for the very short heat conductive path through the solid block and the one rotating joint.

23 Claims, 1 Drawing Sheet

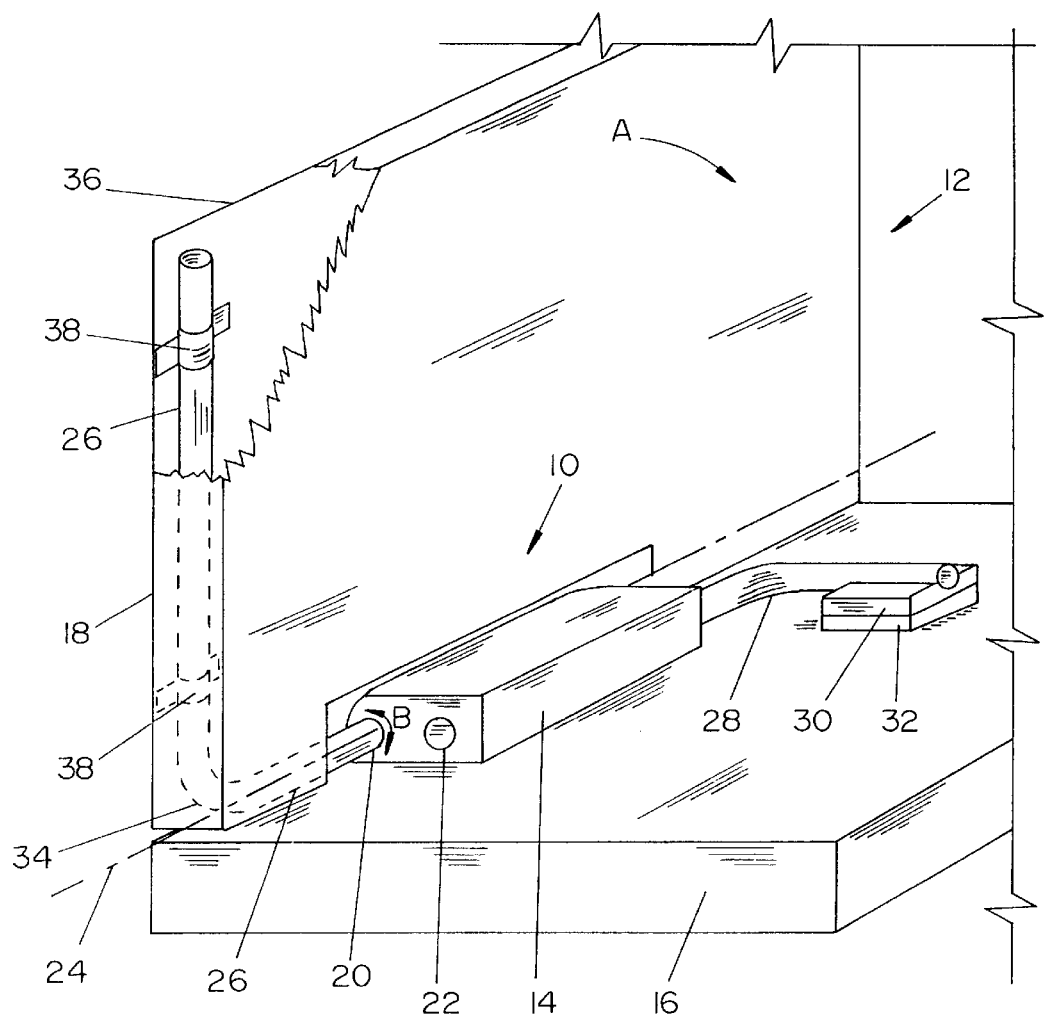

HEAT PIPES INSERTED INTO FIRST AND SECOND PARALLEL HOLES IN A BLOCK FOR TRANSFERRING HEAT BETWEEN HINGED DEVICES

BACKGROUND OF THE INVENTION

This invention deals generally with housings and mounting assemblies for electrical systems and devices, and more specifically with a heat transferring hinge between the two parts of a case of a laptop computer.

With the advent of portable, battery operated, personal computers the cooling of integrated circuit chips has become both more critical and more difficult. Desk top computers which are connected to electrical power lines have comparatively unlimited space and power to locate and operate fans for cooling, and they also do not have severe weight restrictions.

Portable computers, the so called lap top computers, are, however, very restricted in space, power, and weight, and such restrictions create significant problems in cooling the critical integrated circuits and disposing of the generated heat. At the same time, the number of functions and the power dissipated by individual integrated circuits has significantly increased, so that the quantity of heat to be removed has also increased.

Numerous patents have addressed these problems, but most of the devices are very complex and difficult to manufacture so that there are significant possibilities for improvement. Some of the prior art devices use heat sinks which are massive parts and which are impractical to use in a lap top computer. Others make the effort to move the heat away from a heat sink which is adjacent to the integrated circuit chip, but attempt to dissipate the heat in nearby metal components within the keyboard section of the laptop. However, with the high powers of the integrated circuits and the high density of auxiliary heat dissipating components such as CD ROMs, modems, and power supplies now prevalent in computers, the heat load is approaching the limit of what can be dissipated by natural convection from the surface area of the base of the computer, and heat which is not removed from the region near the integrated circuit can build up and can lead to high temperatures and damage to the integrated circuit chip.

SUMMARY OF THE INVENTION

The present invention overcomes this problem by moving the heat generated by integrated circuits within the keyboard section of a laptop computer to the cover, the display screen section, of the laptop. The screen section of a laptop is particularly suited for the disposal of heat because the case behind the screen has few heat generating components, a large surface area for transferring heat to the environment, and, when in use, the back surface is nearly vertical so that natural convection air currents are easily established.

All that is necessary for the cover to act as a heat dissipator is that it be constructed of a material with reasonably good heat conduction in the plane parallel to the display screen. While metals are, of course, generally used as heat conductive materials, many other materials, such as specially formulated plastics or carbon fibers in a carbon impregnated structure, may also be used.

The transfer of heat to the cover surface behind the display screen is accomplished by use of heat pipes and a thermally conductive hinge so that there is only a small temperature difference between the integrated circuit heat sink and the surface which dissipates the heat to the environment.

Only three parts are involved in the invention. Two of the parts are heat pipes. They are simple cylindrical heat pipes. A heat pipe is particularly well suited for moving heat away from integrated circuits, since the heat generated by the integrated circuit is transferred by the heat pipe to any cooler location. The internal evaporation and condensation cycle of the heat pipe moves heat the length of the heat pipe with virtually no temperature difference. Therefore, a heat pipe attached to an integrated circuit and, for example, a cooled wall of a computer cabinet furnishes virtually the same cooling of the integrated circuit as would result from the integrated circuit being mounted directly on the cooled cabinet wall.

However, because the screen section of a laptop computer pivots relative to the keyboard section which includes the integrated circuits, a single heat pipe cannot transfer heat from the integrated circuits to the screen section unless it is a special heat pipe with a flexible section located at the pivot line. Such a special device becomes economically prohibitive. Instead, the present invention uses two simple, inexpensive heat pipes and interconnects them through a heat conducting block so that the block and one of the heat pipes act as a heat conductive hinge.

The structure of the invention is quite simple. The heat conducting block, typically constructed of copper, aluminum, graphite, carbon fiber in a composite carbon structure, or some other good heat conductor, is formed with two cylindrical holes which are parallel and very close to each other. Two cylindrical heat pipes are then inserted into the holes, and at least one of the heat pipes is left free to rotate in its hole. A lubricating or thermal interface material can also be used between the rotating heat pipe and the heat conducting block. This rotating heat pipe is also formed with an angle, usually a right angle, somewhere along its length. When the axis of the rotating heat pipe is located along the pivoting axis between the laptop's screen section and its keyboard section, the combination of the angle and the rotation permits the heat pipe to rotate in the heat conducting block while another part of the heat pipe is located remote from the block in one of the laptop's sections.

The heat pipes of the invention furnish two heat transfer paths within the laptop computer. One path is moves heat from the integrated circuit to the heat conducting block and the other path moves heat from the heat conducting block to a heat dissipating surface in the screen section so that the heat is removed from the laptop computer. The rotating heat pipe can be part of either of these paths depending upon the laptop section in which the heat conducting block is located. With the block in the keyboard section, the rotating heat pipe is attached to a heat dissipating surface within the screen section of the laptop, and with the block in the screen section, the rotating heat pipe is attached to a source of heat such as the integrated circuit heat sink. In either case, the second, non-rotating, heat pipe functions as the other of the two heat transfer paths.

There is also a third heat transfer path, and that is the heat conducting path in the block between the two heat pipes. Although this heat conducting path seems straightforward, it has a subtle but important influence on the heat pipes. Recognizing that the heat pipes used in a typical laptop must be of a relatively small diameter in order not to take up vital space, such small diameters give rise to a problem within the heat conducting block.

With the two heat pipes located adjacent to each other in the heat conducting block the heat transfer path through the block is quite small, both in length and in cross section area. The short length of the heat conducting path is beneficial, and, although the width of this heat transfer path varies with the length of the heat conducting block, this length dimension tends to be limited by the limited space available in the laptop computer. However, the heat transfer path's height is essentially limited by the diameter of the heat pipes, and this dimension is also the approximate height of the heat transfer path through the heat conducting block which largely determines the power density requirements of both the heat conducting block and the heat pipes.

The power density of the heat conducting block has no particular limitation within the power ranges presently required to be transferred for laptop computers. Although, of course, the temperature difference across the heat conducting block rises essentially linearly with increasing power, the short path length in the heat conducting block prevents this from being a significant problem.

There are, however, distinct limitations in the power density capabilities of heat pipes. When a heat pipe reaches its limit of power density it actually stops transferring heat, and in a laptop computer, this can mean that the integrated circuit central processing unit will be destroyed. When the power density capability of a heat pipe is surpassed the wick within the evaporator section of the heat pipe drys out. That is, the evaporator wick evaporates liquid faster than the capillary action of the wick structure can replace the liquid, so that no liquid is present in the evaporator. Under such conditions no evaporation can takes place in the heat pipe, and it simply stops operating. This means it stops cooling the integrated circuit, which usually leads to the destruction of the integrated circuit.

The present invention prevents such a catastrophic failure in higher power laptop computers by using specially constructed heat pipes whose power density capabilities are well above the power densities experienced when the heat conducting block hinge is used in such higher power units. When high power laptop computers are involved, the problem of dry out is prevented only when heat pipes with metal powder wicks are used. Such heat pipes have power density capabilities which surpass that of heat pipes built with such alternatives as metal screen wicks, "V" grooves, or cable arteries, and they can handle the high power density of the heat path in the heat conducting block, which is caused by the small dimensions of the heat conducting block itself.

The present invention thereby furnishes a heat conductive hinge which not only can transfer heat from an integrated circuit across the hinge of a laptop case to the display screen section from which it can be dissipated into the surrounding environment, but it also can handle the heat generated by the highest power laptop computers now in production.

BRIEF DESCRIPTION OF THE DRAWING

The FIGURE is a perspective view of the preferred embodiment of the invention as it is installed within a laptop computer.

DETAILED DESCRIPTION OF THE INVENTION

The FIGURE is a perspective view of heat conductive hinge 10 of the invention as it is installed within laptop computer 12.

Heat conducting block 14 is mounted in either keyboard section 16 or display screen section 18 of laptop computer 12 and contains two cylindrical holes 20 and 22. One hole 20 within conducting block 14 is aligned with pivot axis 24 of keyboard section 16 and screen section 18, and is therefore aligned with any conventional mechanical hinges (not shown) which permit screen section 18 to pivot down against keyboard section 16 in the direction of arrow A. Heat conducting block 14 is constructed of conventional heat conducting materials such as copper, aluminum, or carbon.

Cylindrical heat pipes 26 and 28 are inserted into cylindrical holes 20 and 22 of heat conducting block 14, and the heat pipe in the hole aligned with the pivot axis, heat pipe 26 in the preferred embodiment, is dimensioned so that it can rotate within its hole 20, as indicated by arrow B. The other heat pipe, heat pipe 28 in the FIGURE, is typically bonded to the surface of its hole to assure the best possible heat transfer between the heat pipe and heat conducting block 14.

One of the heat pipes, such as heat pipe 28, is attached to integrated circuit heat sink 30 which is mounted on integrated circuit 32. The connection between heat pipe 28 and integrated circuit heat sink 30 can be made by any conventional means. This arrangement permits heat pipe 28 to transfer heat from integrated circuit 32 to heat conducting block 14 with a very small temperature difference.

Rotating heat pipe 26 includes bend 34, usually a right angle, so that a significant portion of rotating heat pipe 26 can be attached to screen section 18 of laptop computer 12. As shown in the FIGURE, rotating heat pipe 26 is attached to heat dissipating surface 36 of screen section 18 by conventional means such as clamps 38. When heat dissipating surface 36 is a heat conductive surface, the heat transferred to it from heat conducting block 14 by heat pipe 26 is conducted throughout entire heat dissipating surface 36, and since the surface area of heat dissipating surface 36 is large, it can easily transfer the heat to the surrounding air without a large temperature difference.

Heat conductive hinge 10 of the preferred embodiment shown in the FIGURE has been constructed and tested under the following working conditions.

Heat conducting block 14—110 copper 0.5 inch×0.25 inch×1.0 inch

Parallel holes 20 and 22—4 mm in diameter, 0.25 inch apart

Heat pipes 26 and 28—CDA 101 copper tubing; 4 mm outside diameter, 0.019 inch wall thickness; with a wick of sintered copper powder, 0.020 inch thick; water is used as the fluid Heat transfer results—8 watts transferred with a temperature difference of 14.5 degrees C. from the integrated circuit to the heat dissipating surface at ambient air temperature of 23 degrees C.

It should be apparent that the preferred embodiment shown in the FIGURE is only one manner in which to use the invention. Other possibilities include constructing the heat conducting block and the heat pipes so that both heat pipes rotate within the block, or attaching fixed heat pipe 28 to heat conducting block 14 by some means other than inserting it into a hole and bonding it to the inside surface of the hole. Of course, the heat conducting block could also be oriented so that one hole is directly above the other.

The present invention therefore makes it possible to operate laptop computers at high powers with no active or power consuming heat removal devices.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For instance, the holes within heat conducting block need not be exactly parallel, but such an orientation provides the most satisfactory heat transfer between the heat pipes. Moreover, the locations of the heat conducting block, the rotating heat pipe, and the fixed heat pipe could be changed so that the rotating heat pipe is mounted in the keyboard section of a laptop computer. Furthermore, as noted previously, the material of the heat conducting block may be changed.

What is claimed as new and for which Letters patent of the United States are desired to be secured is:

1. An apparatus for transferring heat across a hinged joint comprising:

a first device;

a second device;

a hinged joint with a pivot axis attached to the first device and to the second device so that the second device pivots upon the pivot axis relative to the first device;

a heat conducting block mounted on the first device, the heat conducting block having a cylindrical first hole aligned on the pivot axis;

a cylindrical first heat pipe inserted into the cylindrical first hole so that the first heat pipe rotates within the first hole, the first heat pipe including a bend so that a first part of the first heat pipe extends from the heat conducting block to the bend and a second part of the first heat pipe extends away from the bend on the side of the bend away from the heat conducting block, with the second part of the first heat pipe extending to and thermally connected to a first heat transfer apparatus mounted on the second device, so that the second device and the first heat pipe pivot relative to the first device; and a second heat pipe attached to the heat conducting block and extending to and thermally connected to a second heat transfer apparatus mounted on the first device, wherein the second heat pipe is inserted into a second hole in the heat conducting block and the first and second hole in the conducting block are parallel.

2. The apparatus of claim 1 wherein heat pipes have metal powder wicks.

3. The apparatus of claim 1 wherein the bend in the first heat pipe is a right angle.

4. The apparatus of claim 1 wherein the heat conducting block is constructed of copper.

5. The apparatus of claim 1 wherein the heat conducting block is constructed of aluminum.

6. The apparatus of claim 1 wherein the heat conducting block is constructed of graphite.

7. The apparatus of claim 1 wherein the heat conducting block is constructed of carbon fibers in a carbon composite structure.

8. A heat conducting hinge comprising:

a heat conducting block having at least one cylindrical hole;

at least one cylindrical first heat pipe inserted into one cylindrical hole so that the first heat pipe rotates within the hole, the first heat pipe including a bend so that a first part of the first heat pipe extends from the heat conducting block to the bend and a second part of the first heat pipe extends away from the bend on the side of the bend away from the heat conducting block, with the second part of the first heat pipe extending to and thermally connected to a first heat transfer apparatus, so that the first heat transfer apparatus and the second part of the first heat pipe pivot relative to the heat conducting block; and at least one second heat pipe attached to the heat conducting block and extending to and thermally connected to a second heat transfer apparatus, wherein the second heat pipe is inserted into a second hole in the heat conducting block and the first and second hole in the conducting block are parallel.

9. The apparatus of claim 8 wherein the heat pipes have metal powder wicks.

10. The apparatus of claim 8 wherein the bend in the first heat pipe is a right angle.

11. The apparatus of claim 8 wherein the heat conducting block is constructed of copper.

12. The apparatus of claim 8 wherein the heat conducting block is constructed of aluminum.

13. The apparatus of claim 8 wherein the heat conducting block is constructed of graphite.

14. The apparatus of claim 8 wherein the heat conducting block is constructed of carbon fibers in a carbon composite structure.

15. An apparatus for transferring heat across a hinged joint of a laptop computer comprising:

a first section of a laptop computer;

a second section of a laptop computer;

a hinged joint with a pivot axis attached to the first section of the laptop computer and to the second section of the laptop computer so that the second section pivots upon the pivot axis relative to the first section;

a heat conducting block mounted on the first section of the laptop computer, the heat conducting block having a cylindrical first hole aligned on the pivot axis;

a cylindrical first heat pipe inserted into the cylindrical first hole so that the first heat pipe rotates within the first hole, the first heat pipe including a bend so that a first part of the first heat pipe extends from the heat conducting block to the bend and a second part of the first heat pipe extends away from the bend on the side of the bend away from the heat conducting block, with the second part of the first heat pipe extending to and thermally connected to a first heat transfer apparatus mounted on the second section of the laptop computer, so that the second section of the laptop computer and the first heat pipe pivot relative to the first section of the laptop computer; and a second heat pipe attached to the heat conducting block and extending to and thermally connected to a second heat transfer apparatus mounted on the first section of the laptop computer, wherein the second heat pipe is inserted into a second hole in the heat conducting block and the first and second hole in the conducting block are parallel.

16. The apparatus of claim 15 wherein the heat pipes have metal powder wicks.

17. The apparatus of claim 15 wherein the bend in the first heat pipe is a right angle.

18. The apparatus of claim 15 wherein the heat conducting block is constructed of copper.

19. The apparatus of claim 15 wherein the heat conducting block is constructed of aluminum.

20. The apparatus of claim 15 wherein the heat conducting block is constructed of graphite.

21. The apparatus of claim 15 wherein the heat conducting block is constructed of carbon fibers in a carbon composite structure.

22. The apparatus of claim 15 wherein the first section of the laptop computer includes a keyboard.

23. The apparatus of claim 15 wherein the first section of the laptop computer includes a display screen.

* * * * *